Figure 1:
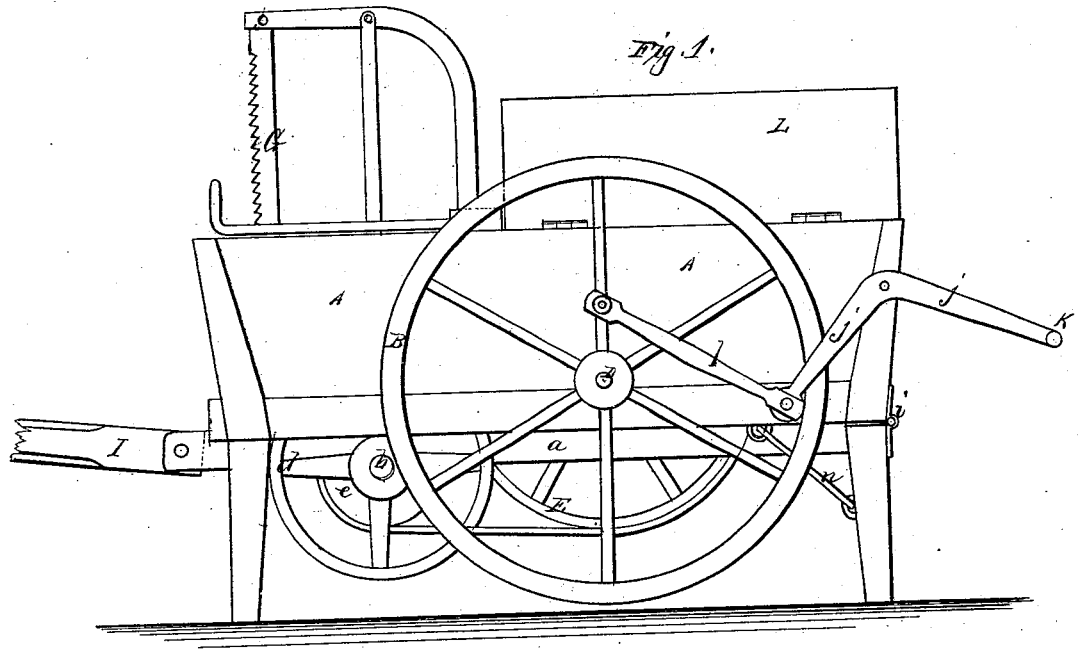
Figure 2:
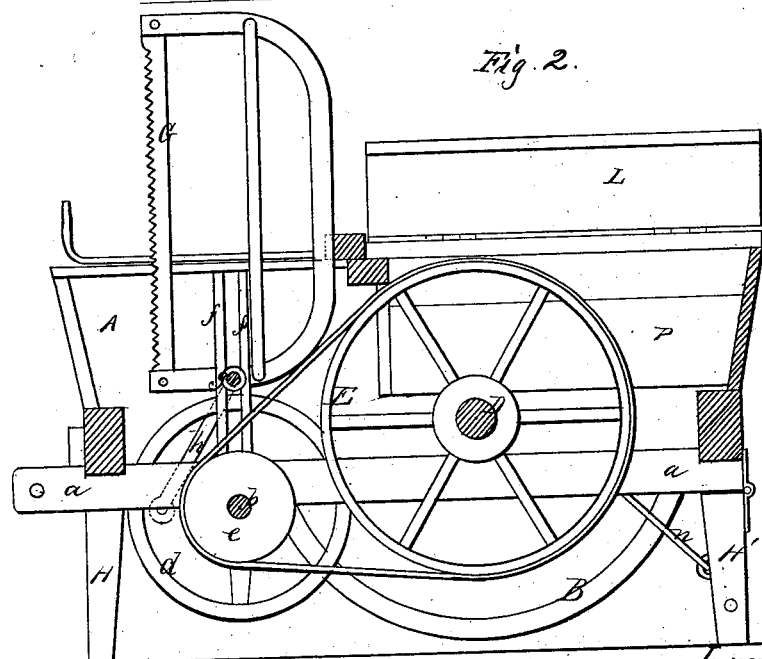

P. Johnson,

Sawing Machine.

No. 109,910. Patented Dec. 6, 1870.

Witnesses
Geo. H. Strong.
G. Fitzgerald

Inventor.
Per Johnson
By his Atty's
Dewey & Co.

United States Patent Office.

PER JOHNSON, OF COLUMBIA, CALIFORNIA.

Letters Patent No. 109,910, dated December 6, 1870.

IMPROVEMENT IN SAWING-MACHINES.

The Schedule referred to in these Letters Patent and making part of the same.

*To all whom it may concern:*

Be it known that I, PER JOHNSON, of Columbia, county of Tuolumne, State of California, have invented a Portable Sawing-Machine; and I do hereby declare the following description and accompanying drawing are sufficient to enable any person skilled in the art or science to which it most nearly appertains to make and use my said invention without further invention or experiment.

My invention relates to improvements in mounting and operating saws, and also to an improved portable apparatus or cart, inside of which the saws are arranged to operate and be operated, the power being applied by hand.

In order to explain my invention so that others will be able to understand its construction and operation, reference is had to the accompanying drawing forming a part of this specification, in which—

A represents a box on the body of a cart having upon each side a large wheel, B.

These wheels are fixed upon the opposite ends of a shaft, D.

This shaft passes through the body or box A at about its middle, and has another and smaller wheel, E, fixed upon it at its middle, inside the box.

Two parallel timbers or reaches, *a a*, pass from the front end of the body A to the rear end, being secured at each end to the bottom timbers.

Near the front end of the body, and passing transversely through the reaches *a a*, is a shaft, *b*, to each end of which is fixed a wheel, *d*, outside of the reaches *a*.

Another wheel, *e*, is secured to the middle of this shaft, between the reaches.

The wheel *e* is driven by a belt from the large wheel E.

Two parallel upright guide-bars, *f f*, extend from each of the reaches above the shaft *e* to the top of the box A, between which a horizontal bar, *g*, moves.

The saws G are secured in a suitable frame so as to work through the top of the body or box. These saws are placed at a suitable distance apart to cut the wood into suitable lengths for fine-wood.

The lower ends of the saw-frames are secured to the horizontal bar *g*, and a reciprocating motion is given to the whole by pitmen *h*, which connect the bar *g* with the wheels *d*, to which they are attached eccentrically.

The cart or box is provided with legs, H H', which are of sufficient length to cause the wheels B to be raised above the ground when they are in position to support the body, thus allowing the cart-wheels to serve both as driving and balance-wheels.

The wheels B are driven by hand-power applied to a rod, K.

This rod has its opposite ends attached to one end of crank-levers *j j*, which have their pivot or fulcrum at the rear corners of the body A.

Their opposite ends are connected with the driving-wheels B by pitmen *l*, which are eccentrically attached to them.

With this combination a person standing at the rear end of the box or cart will be able to drive the saws at great speed with little exertion, as the heavy cart-wheels will serve as fly or balance-wheels, to keep up the motions of the saws.

The rear legs H' are made in two parts and hinged at *i*, so that they can be folded up against the rear end of the body. This lowers the wheels B upon the ground, when, by securing the pole I between the front ends of the reaches *a a*, the whole machine will be converted into a cart, which can be moved about as desired by horses.

The folding legs H', when brought down so as to support the machine, are kept firmly in position by hooks, *n*, which catch in an eye on the under side of the body.

The upper rear portion of the body A is provided with double doors, L, and inside the compartment thus formed boxes, P, are arranged, in which any tools which it may be necessary to carry about with the machine can be kept.

The above construction will provide a cheap and efficient wood-sawing machine, which can be moved about at pleasure and operated with great ease.

Having thus described my invention,

What I claim, and desire to secure by Letters Patent, is—

1. The body A, provided with the rigid legs H, folding legs H', and driving or carrying-wheels B, substantially as and for the purpose described.

2. The peculiar combination herein described for operating the saws G, consisting of the wheels *d* and *e* and pitmen *h*, together with the parallel guide-rods *f f* and horizontal bar *g*, the whole constructed and operated as herein described.

In witness that the above-described invention is claimed by me, I have hereunto set my hand and seal.

PER JOHNSON. [L. S.]

Witnesses:
H. N. SNOW,
GERALD FITZGERALD.